US011768892B2

(12) United States Patent
Huang et al.

(10) Patent No.: US 11,768,892 B2
(45) Date of Patent: Sep. 26, 2023

(54) METHOD AND APPARATUS FOR EXTRACTING NAME OF POI, DEVICE AND COMPUTER STORAGE MEDIUM

(71) Applicant: BAIDU ONLINE NETWORK TECHNOLOGY (BEIJING) CO., LTD., Beijing (CN)

(72) Inventors: Jizhou Huang, Beijing (CN); Haifeng Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 357 days.

(21) Appl. No.: 17/277,708

(22) PCT Filed: May 28, 2020

(86) PCT No.: PCT/CN2020/092984
§ 371 (c)(1),
(2) Date: Mar. 18, 2021

(87) PCT Pub. No.: WO2021/093308
PCT Pub. Date: May 20, 2021

(65) Prior Publication Data
US 2022/0019632 A1   Jan. 20, 2022

(30) Foreign Application Priority Data
Nov. 13, 2019   (CN) .......................... 201911105580.X

(51) Int. Cl.
*G06F 16/9532*   (2019.01)
*G06V 10/25*   (2022.01)
(Continued)

(52) U.S. Cl.
CPC ........ *G06F 16/9532* (2019.01); *G06F 18/214* (2023.01); *G06V 10/22* (2022.01); *G06V 10/25* (2022.01); *G06V 20/35* (2022.01)

(58) Field of Classification Search
CPC .... G06F 16/9532; G06F 18/214; G06V 10/25
See application file for complete search history.

(56) References Cited

U.S. PATENT DOCUMENTS 8,131,118 B1 *   3/2012   Jing .......................... G01S 5/16
                                                          701/426
8,589,069 B1 *  11/2013   Lehman ................ H04W 4/023
                                                        340/995.14
(Continued)

FOREIGN PATENT DOCUMENTS

CN         101350154 A     1/2009
CN         103106272 A     5/2013
(Continued)

OTHER PUBLICATIONS

Chinese Application Serial No. 201911105580.X, Notice of Allowance dated Dec. 16, 2020.
(Continued)

*Primary Examiner* — Mark E Hershley
(74) *Attorney, Agent, or Firm* — Kwan & Olynick LLP

(57) ABSTRACT

The present application discloses a method and apparatus for extracting the name of a POI, a device and a computer storage medium, and relates to the field of big data. An implementation includes: acquiring two or more text fragments identified from image data of the POI; constructing two or more candidate names using the text fragments; and ranking the candidate names using a pre-trained name ranking model, and determining the name of the POI according to the result of the ranking; wherein the name ranking model determines the probability of each candidate name as the name of the POI using at least one of a search web page
(Continued)

feature, a document statistical feature and a semantic feature extracted from each candidate name, and ranks the candidate names according to the probabilities. With the present application, the name of the POI is automatically extracted with high accuracy. Compared with the manual review and annotation way in the prior art, a human cost is reduced.

16 Claims, 7 Drawing Sheets

(51) Int. Cl.
    *G06F 18/214* (2023.01)
    *G06V 20/00* (2022.01)
    *G06V 10/22* (2022.01)

(56) References Cited

U.S. PATENT DOCUMENTS

| | | | | |
|---|---|---|---|---|
| 8,688,377 | B1* | 4/2014 | Urbach | G01C 21/30 701/425 |
| 9,418,283 | B1* | 8/2016 | Natarajan | G06V 20/63 |
| 10,096,033 | B2* | 10/2018 | Heath | G06Q 30/02 |
| 10,630,639 | B2* | 4/2020 | Bilsten | G06F 16/955 |
| 11,308,284 | B2* | 4/2022 | Huang | G06F 16/90332 |
| 2002/0120397 | A1* | 8/2002 | Kepler | G01C 21/3644 701/426 |
| 2003/0176965 | A1* | 9/2003 | Padmanabhan | G01C 21/20 701/408 |
| 2005/0123200 | A1* | 6/2005 | Myers | G06V 30/1478 382/182 |
| 2006/0069504 | A1* | 3/2006 | Bradley | G01C 21/3682 701/426 |
| 2007/0043504 | A1* | 2/2007 | Dorfman | G09B 29/006 701/484 |
| 2007/0140595 | A1* | 6/2007 | Taylor | G06V 20/63 701/468 |
| 2008/0056562 | A1* | 3/2008 | Hosoi | G06V 10/28 382/155 |
| 2010/0250126 | A1* | 9/2010 | Epshtein | G01C 21/3602 701/438 |
| 2011/0178697 | A1* | 7/2011 | Mincey | G01C 21/3644 701/532 |
| 2012/0092329 | A1* | 4/2012 | Koo | G06V 20/63 345/419 |
| 2014/0006408 | A1* | 1/2014 | Rae | G06F 40/295 707/E17.089 |
| 2014/0080428 | A1* | 3/2014 | Rhoads | G06V 20/10 455/88 |
| 2014/0270536 | A1* | 9/2014 | Amtrup | G06V 30/40 382/195 |
| 2015/0112981 | A1* | 4/2015 | Conti | G06F 16/38 707/730 |
| 2015/0169977 | A1* | 6/2015 | Corpet | G06F 16/50 382/201 |
| 2015/0278298 | A1* | 10/2015 | Boldyrev | G06F 16/245 707/769 |
| 2016/0019704 | A1* | 1/2016 | Liu | G01C 21/3811 345/619 |
| 2016/0147826 | A1* | 5/2016 | Mishra | G06Q 10/063112 707/736 |
| 2016/0154826 | A1* | 6/2016 | Tseng | G06F 16/583 707/724 |
| 2016/0379080 | A1* | 12/2016 | Yalniz | G06T 7/90 382/164 |
| 2017/0109615 | A1* | 4/2017 | Yatziv | G06F 18/24323 |
| 2017/0289624 | A1* | 10/2017 | Avila | G06V 10/464 |
| 2017/0309072 | A1* | 10/2017 | Li | H04L 67/306 |
| 2018/0014161 | A1* | 1/2018 | Warren | G06F 16/24578 |
| 2018/0189609 | A1* | 7/2018 | Park | G06F 18/41 |
| 2018/0204111 | A1* | 7/2018 | Zadeh | G06V 10/764 |
| 2018/0350144 | A1* | 12/2018 | Rathod | G06Q 20/3224 |
| 2019/0164004 | A1* | 5/2019 | Chen | G06V 40/173 |
| 2019/0231097 | A1* | 8/2019 | Johnson | G06Q 30/0633 |
| 2020/0120441 | A1* | 4/2020 | Fonti | G06F 16/29 |
| 2020/0151265 | A1* | 5/2020 | Gupta | G06N 20/00 |
| 2020/0193552 | A1* | 6/2020 | Turkelson | G06N 20/20 |
| 2022/0058425 | A1* | 2/2022 | Savvides | G06F 18/214 |
| 2022/0121884 | A1* | 4/2022 | Zadeh | G06V 10/764 |
| 2022/0383037 | A1* | 12/2022 | Pham | G06N 3/09 |

FOREIGN PATENT DOCUMENTS

| | | |
|---|---|---|
| CN | 103226601 A | 7/2013 |
| CN | 103336807 A | 10/2013 |
| CN | 105550169 A | 5/2016 |
| CN | 105550330 A | 5/2016 |
| CN | 105721629 A | 6/2016 |
| CN | 107292302 A | 10/2017 |
| CN | 107402954 A | 11/2017 |
| CN | 108090220 A | 5/2018 |
| CN | 108491421 A | 9/2018 |
| CN | 108959551 A | 12/2018 |
| CN | 109145219 A | 1/2019 |
| CN | 109783651 A | 5/2019 |
| CN | 109903065 A | 6/2019 |
| CN | 109992638 A | 7/2019 |
| CN | 110321885 A | 10/2019 |
| CN | 110399568 A | 11/2019 |
| CN | 111026937 A | 4/2020 |
| EP | 3240258 A1 | 11/2017 |
| JP | 2005214961 A | 8/2005 |
| JP | 2008287388 A | 11/2008 |
| JP | 2009245179 A | 10/2009 |
| JP | 2011191982 A | 9/2011 |
| JP | 2017173900 A | 9/2017 |
| JP | 2018195272 A | 12/2018 |
| JP | 2019503025 A | 1/2019 |
| WO | 2008146456 A1 | 12/2008 |
| WO | 2018213763 A1 | 11/2018 |

OTHER PUBLICATIONS

European Application Serial No. 20861990.8, Search Report dated Nov. 9, 2021.
Messelodi, Stefano, et al; "i-Street: Detection, Identification, Augmentation of Street Plates in a Touristic Mobile Application", Image Analysis and Processing—ICIAP, Jan. 1, 2015, 11 pages.
The Design and Implementation of Recommender System Based on Learning to Rank, with English Abstract, 60 pages.
The Research and Application of Image Retrieval System Based on Comprehensive Feature, with English Abstract, dated May 19, 2014, document Y2684882, 74 pages.
PCT International Search Report, PCT Application No. PCT/CN2020/092984, dated Aug. 11, 2020, 5 pages.
Office Action, China Patent Application No. 201911105580.X, dated May 29, 2020, 12 pages.
Search Report, China Patent Application No. 201911105580.X, dated May 26, 2020, 5 pages.
Search Report, China Patent Application No. 201911105580.X, dated Aug. 21, 2020, 5 pages.
Office Action, China Patent Application No. 201911105580.X, dated Aug. 31, 2020, 15 pages.
First Office Action for JP2021-513957, dated May 13, 2022, 5 pages.

* cited by examiner

METHOD AND APPARATUS FOR EXTRACTING NAME OF POI, DEVICE AND COMPUTER STORAGE MEDIUM

This application is a national application and, pursuant to 35 U.S.C. § 371, is entitled to and claims the right of priority based on PCT application no. PCT/CN2020/092984, filed May 28, 2020, which claims priority to Chinese Patent Application No.201911105580.X, entitled "Method and Apparatus For Extracting Name of POI, Device and Computer Storage Medium", filed on Nov. 13, 2019, all of which are incorporated by reference in their entirety.

FIELD OF THE DISCLOSURE

The present application relates to the technical field of computers, and particularly to a method and apparatus for extracting the name of a POI, a device and a computer storage medium in the field of big data.

BACKGROUND OF THE DISCLOSURE

A point of interest (POI) is a term in a geographic information system, and generally refers to all geographic objects which may be abstracted as points. A POI may be a house, a shop, a mailbox, a bus station, a school, a hospital, or the like. The POI has a main purpose of describing the position of a thing or an event, thereby enhancing the capacity of describing and querying the position of the thing or event.

In Internet map applications, the POI plays a very important role. A user may conveniently find a place of interest and a route to the place in a map using the POI. In the real world, new POIs continuously emerge due to the development of society, and how to more comprehensively, timely and accurately mine the new POIs is very important work. As a common way, image data may be collected, for example, a street view image, or the like, the name of the POI may be extracted from the collected image data, and an association relationship between the name of the POI and a location is established in conjunction with a collection place.

In the prior art, when extracted from the collected image data, the name of the POI is frequently determined by performing manual review and annotation after character recognition is performed on the image data. Obviously, this way requires a lot of manpower and is costly.

SUMMARY OF THE DISCLOSURE

In view of this, the present application provides a method and apparatus for extracting the name of a POI, a device and a computer storage medium, so as to reduce a human cost.

In a first aspect, the present application provides a method for extracting the name of a POI, including:
acquiring two or more text fragments identified from image data of the POI;
constructing two or more candidate names using the text fragments; and
ranking the candidate names using a pre-trained name ranking model, and determining the name of the POI according to the result of the ranking;
wherein the name ranking model determines the probability of each candidate name as the name of the POI using at least one of a search web page feature, a document statistical feature and a semantic feature extracted from each candidate name, and ranks the candidate names according to the probabilities.

According to a preferred implementation of the present application, the constructing two or more candidate names using the text fragments includes:
permuting and combining the text fragments to obtain the two or more candidate names;
the determining the name of the POI according to the result of the ranking includes:
taking the top candidate name as the name of the POI.

According to a preferred implementation of the present application, the constructing two or more candidate names using the text fragments includes:
identifying a branch information fragment from the text fragments; and
permuting and combining other text fragments in the text fragments than the branch information fragment to obtain the two or more candidate names;
the determining the name of the POI according to the result of the ranking includes:
combining the top candidate name with the branch information fragment to obtain the name of the POI.

According to a preferred implementation of the present application, the identifying a branch information fragment from the text fragments includes:
judging each text fragment using a pre-trained judging model to determine whether each text fragment is the branch information fragment.

According to a preferred implementation of the present application, the judging model is pre-trained by:
acquiring sample data from a POI database with a branch information text as a positive sample and a non-branch information text as a negative sample; and
training the judging model with the sample data.

According to a preferred implementation of the present application, extracting the search web page feature from the candidate name includes:
performing a search with the candidate name as a query; and
performing a semantic coding operation on an acquired search result to obtain an implicit vector of the search result as the search web page feature of the candidate name.

According to a preferred implementation of the present application, the performing a semantic coding operation on an acquired search result to obtain an implicit vector of the search result includes:
acquiring top N search result texts, N being a preset positive integer;
performing a semantic coding operation on each acquired search result text to obtain an implicit vector of each search result text; and
fusing the implicit vectors of the search result texts to obtain the implicit vector of the search result.

According to a preferred implementation of the present application, extracting the document statistical feature from the candidate name includes:
counting an inverse document frequency of the candidate name in web page data; and
taking a representation vector of the inverse document frequency as the document statistical feature of the candidate name.

According to a preferred implementation of the present application, extracting the semantic feature from the candidate name includes:
obtaining a semantic representation vector of each text fragment contained in the candidate name based on at least one of a semantic feature, a position feature and a document statistical feature of each text fragment; and fusing the semantic representation vectors of the text fragments to obtain the semantic representation vector of the candidate name.

According to a preferred implementation of the present application, the semantic representation vector of the text fragment is determined by:

performing a semantic coding operation on the text fragment to obtain an implicit vector of the text fragment;

mapping the position of the text fragment in the candidate name in a vector space to obtain a position representation vector of the text fragment;

counting an inverse document frequency of the text fragment in the web page data to obtain a representation vector of the inverse document frequency; and splicing the implicit vector, the position representation vector and the representation vector of the inverse document frequency of the text fragment to obtain the semantic representation vector of the text fragment.

In a second aspect, the present application provides a method for building a name ranking model, including:

acquiring training samples including a positive example and a negative example of the name of a POI;

extracting at least one of a search web page feature, a document statistical feature and a semantic feature from each training sample, and determining the probability of each training sample as the name of the POI; and performing a training operation with a pairwise algorithm to obtain the name ranking model with a training target of maximizing the difference between the probability of the positive example as the name of the POI and the probability of the negative example as the name of the POI.

According to a preferred implementation of the present application, the extracting a search web page feature from the training sample includes:

performing a search with the training sample as a query; and performing a semantic coding operation on an acquired search result to obtain an implicit vector of the search result as the search web page feature of the training sample.

According to a preferred implementation of the present application, the performing a semantic coding operation on an acquired search result to obtain an implicit vector of the search result includes:

acquiring top N search result texts, N being a preset positive integer;

performing a semantic coding operation on each acquired search result text to obtain an implicit vector of each search result text; and fusing the implicit vectors of the search result texts to obtain the implicit vector of the search result.

According to a preferred implementation of the present application, the extracting a document statistical feature from the training sample includes:

counting an inverse document frequency of the training sample in web page data; and taking a representation vector of the inverse document frequency as the document statistical feature of the training sample.

According to a preferred implementation of the present application, the extracting a semantic feature from the training sample includes:

obtaining a semantic representation vector of each text fragment contained in the training sample based on at least one of a semantic feature, a position feature and a document statistical feature of each text fragment; and fusing the semantic representation vectors of the text fragments to obtain the semantic representation vector of the training sample.

According to a preferred implementation of the present application, the semantic representation vector of the text fragment is determined by:

performing a semantic coding operation on the text fragment to obtain an implicit vector of the text fragment;

mapping the position of the text fragment in a candidate name in a vector space to obtain a position representation vector of the text fragment;

counting an inverse document frequency of the text fragment in the web page data to obtain a representation vector of the inverse document frequency; and splicing the implicit vector, the position representation vector and the representation vector of the inverse document frequency of the text fragment to obtain the semantic representation vector of the text fragment.

In a third aspect, the present application further provides an apparatus for extracting the name of a POI, including:

an acquiring unit configured to acquire two or more text fragments identified from image data of the POI;

a constructing unit configured to construct two or more candidate names using the text fragments; and a ranking unit configured to rank the candidate names using a pre-trained name ranking model; wherein the name ranking model determines the probability of each candidate name as the name of the POI using at least one of a search web page feature, a document statistical feature and a semantic feature extracted from each candidate name, and ranks the candidate names according to the probabilities; and a determining unit configured to determine the name of the POI according to the result of the ranking of the ranking unit.

In a fourth aspect, the present application further provides an apparatus for building a name ranking model, including:

a sample acquiring unit configured to acquire training samples including a positive example and a negative example of the name of a POI;

a model training unit configured to extract at least one of a search web page feature, a document statistical feature and a semantic feature from each training sample, and determine the probability of each training sample as the name of the POI; perform a training operation with a pairwise algorithm to obtain the name ranking model with a training target of maximizing the difference between the probability of the positive example as the name of the POI and the probability of the negative example as the name of the POI.

In a fifth aspect, the present application further provides an electronic device, including:

at least one processor; and a memory connected with the at least one processor communicatively;

wherein the memory stores instructions executable by the at least one processor to cause the at least one processor to perform any of the methods as mentioned above.

In a sixth aspect, the present application further provides a non-transitory computer readable storage medium with computer instructions stored thereon, wherein the computer instructions are used for causing a computer to perform any of the methods as mentioned above.

From the above technical solution, the method and apparatus, the device as well as the computer storage medium according to the present application may have the following advantages.

1) In the present application, after the candidate names are constructed using the text fragments identified from the image data of the POI, the probability of each candidate name as the name of the POI is determined with at least one of the search web page feature, the document statistical feature and the semantic feature of the candidate name, and the candidate names are ranked according to the probabilities, thereby automatically extracting the name of the POI and achieving high accuracy. Compared with the manual review and annotation way in the prior art, the human cost is reduced.

2) In the present application, the branch information fragment may be identified first, the candidate names are then constructed with the other text fragments than the branch information fragment and are ranked, and then, the name of the POI is obtained using the top candidate name and the branch information fragment, thus further improving the accuracy and the efficiency of extraction of the name of the POI.

3) In the present application, the document statistical features, the search web page features and the semantic features of the candidate names are used to introduce ideographic capability descriptions of the candidate names, such as the inverse document frequency, the search result, the position of each text fragment, the inverse document frequency, the semantics, or the like, into the candidate names to serve as a probability estimate of the name of the POI, thereby selecting the candidate name which best expresses the meaning of the name of the POI.

Other effects of the above-mentioned alternatives will be described below in conjunction with embodiments.

BRIEF DESCRIPTION OF DRAWINGS

The drawings are used for better understanding the present solution and do not constitute a limitation of the present application. In the drawings.

DETAILED DESCRIPTION OF PREFERRED EMBODIMENTS

The following part will illustrate exemplary embodiments of the present application with reference to the figures, including various details of the embodiments of the present application for a better understanding. The embodiments should be regarded only as exemplary ones. Therefore, those skilled in the art should appreciate that various changes or modifications can be made with respect the embodiments described herein without departing from the scope and spirit of the present application. Similarly, for clarity and conciseness, the descriptions of the known functions and structures are omitted in the descriptions below.

Figure 1:
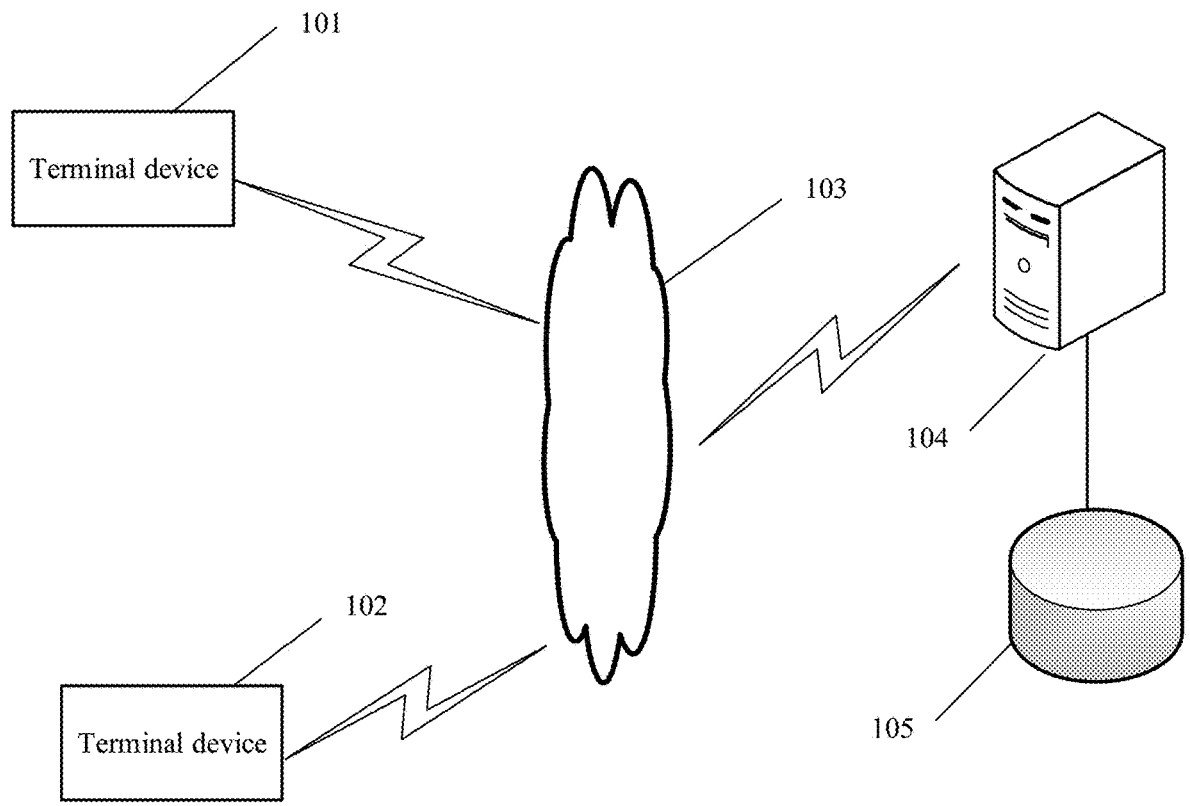
FIG. 1 shows an exemplary system architecture to which a method or apparatus according to embodiments of the present application may be applied.

FIG. 1 shows an exemplary system architecture to which methods or apparatuses according to embodiments of the present application may be applied. As shown in FIG. 1, the system architecture may include terminal devices 101, 102, a network 103 and a server 104. The network 103 serves as a medium for providing communication links between the terminal devices 101, 102 and the server 104. The network 103 may include various connection types, such as wired and wireless communication links, or fiber-optic cables, or the like.

Users may use the terminal devices 101, 102 to interact with the server 104 through the network 103. Various applications, such as a map application, a web browser application, a communication application, or the like, may be installed on the terminal devices 101, 102.

The terminal devices 101, 102 may be configured as various user devices in which the map applications may be run, including, but not limited to, smart phones, tablets, PCs, smart televisions, or the like. An apparatus for extracting the name of a POI and an apparatus for building a name ranking model according to the present application may be provided and run in the above-mentioned server 104 or a device independent of the server 104. The apparatus may be implemented as a plurality of pieces of software or a plurality of software modules (for example, for providing distributed service), or a single piece of software or a single software module, which is not specifically limited herein. The server 104 may interact with a POI database 105, and specifically, the server 104 may acquire data from the POI database 105 or store data in the POI database 105. The POI database 105 stores map data including POI information.

For example, the apparatus for extracting the name of the POI is provided and run in the above-mentioned server 104, and the server 104 extracts the name of the POI based on image data of the POI using the method according to the embodiment of the present application, and then updates the POI database 105 with the acquired name of the POI and a place corresponding to the image data of the POI. The server 104 is able to query the POI database 105 in response to a query request of the terminal devices 101, 102 and return the queried POI information to the terminal devices 101, 102. The terminal devices 101, 102 may also adopt the image data of the POI and upload the image data of the POI and corresponding collecting location information to the server 107.

The server 104 may be configured as a single server or a server group including a plurality of servers. In addition, the server 104 may be configured as other computer systems or processors with higher computing performance, besides existing in the form of a server. It should be understood that the numbers of the terminal devices, the network, the server and the database in FIG. 1 are merely schematic. There may be any number of terminal devices, networks, servers and databases as desired for an implementation.

First Embodiment

Figure 2:
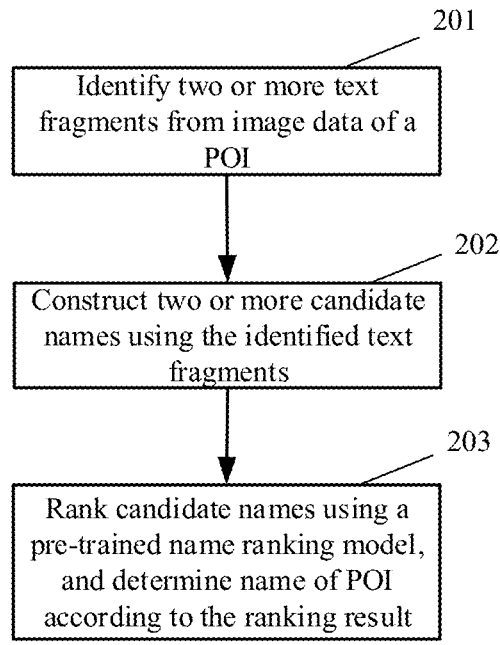
FIG. 2 is a flow chart of a main method according to an embodiment of the present application.

FIG. 2 is a flow chart of a main method according to an embodiment of the present disclosure, and as shown in FIG. 2, the method may include the following steps:

In 201, it identifies two or more text fragments from image data of a POI.

Figure 3:
FIG. 3 is a diagram of an instance of a signboard image of a POI according to an embodiment of the present application.

The present application has the scenario that the image data of the POI is acquired, and the name of the POI is required to be extracted from the image data of the POI. In the present application, the way of collecting the image data of the POI is not limited, and the image data may be collected by a special collection personnel at the POI, or collected and uploaded by a user by means of the terminal device. Usually, the image data of the POI is a taken signboard image of the POI, as shown in FIG. 3.

The text recognition may be performed on the image data of the POI by means of optical character recognition (OCR), or the like, and the present application is applicable to a case where plural texts are contained in the signboard image of the POI. As shown in FIG. 3, three text fragments "Sanqianjia", "ecological slimming", "Yinzuo garden shop" may be recognized from the image.

In addition, it should be noted that if only one text fragment is recognized from the image data of the POI, the text fragment may be directly used as the name of the POI.

In 202, it constructs two or more candidate names using the identified text fragments.

In 203, it ranks the candidate names using a pre-trained name ranking model, and determines the name of the POI according to the result of the ranking.

The name ranking model determines the probability of each candidate name as the name of the POI using at least one of a search web page feature, a document statistical feature and a semantic feature extracted from each candidate name, and ranks the candidate names according to the probabilities.

As one implementation, the two or more candidate names may be obtained after the text fragments identified in the step 201 are permuted and combined; and then, the candidate names are ranked using the pre-trained name ranking model, and the top candidate name is taken as the name of the POI.

However, as a preferred implementation, branch information may be first identified from the text fragment identified in the step 201, and then, the candidate names are constructed and ranked to obtain the final name of the POI, which may provide a more accurate name of the POI. Such a preferred implementation will be described below in detail in conjunction with embodiments.

Second Embodiment

Figure 4:
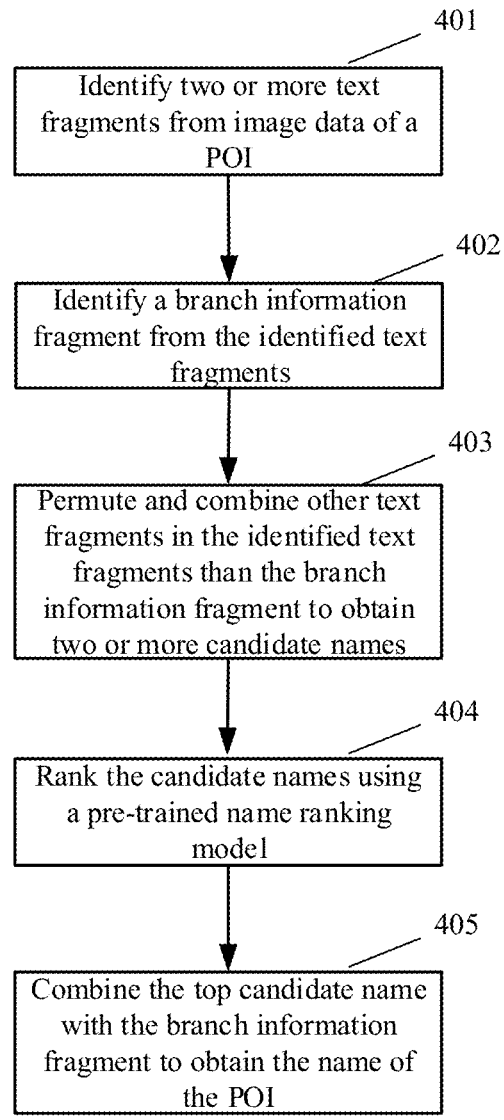
FIG. 4 is a flow chart of a preferred method according to an embodiment of the present application.

FIG. 4 is a flow chart of a preferred method according to an embodiment of the present application, and as shown in FIG. 4, the method may include the following steps:

In 401, it identifies two or more text fragments from image data of a POI.

This step is the same as the step 201 and is not repeated herein.

In 402, it identifies a branch information fragment from the identified text fragments.

In this step, each text fragment may be judged using a pre-trained judging model to determine whether each text fragment is the branch information fragment.

In the present application, training samples may be acquired from a POI database in advance, for example, a name of a POI "Haidilao Hotpot Wanliu shop" is acquired from the POI database and divided into two text fragments "Haidilao Hotpot" and "Wanliu shop". The "Haidilao Hotpot" is manually annotated as a non-branch information fragment, i.e., a negative example, and the "Wanliu shop" is manually annotated as the branch information fragment, i.e., a positive example. Then, the judging model is trained with the training samples. The judging model may be, but not limited to, a judging model based on enhanced representation from knowledge integration (ERNIE) and bidirectional encoder representations from transformers (BERT), a gradient boosting decision tree (GBDT) model, or the like.

After the judging model is trained, the text fragment is input into the judging model to obtain a judgment result output by the judging model, i.e., whether the text fragment is the branch information fragment.

It should be noted that besides the identification of the branch information fragment using the pre-trained judging model, a branch may be identified using other ways in the present application, for example, a template-based way, a keyword dictionary-based way, or the like. For example, templates "_branch", or the like, are pre-configured, and the text fragments matched with these templates are identified as the branch information fragments.

In 403, it permutes and combines other text fragments in the identified text fragments than the branch information fragment to obtain two or more candidate names.

It is assumed that the number of the identified text fragments is m, one of the text fragments is identified as the branch information fragment $t_b$, and a set T1 of the remaining m−1 text fragments is $\{t_i\}$, i=1, ..., m−1. M is a positive integer greater than or equal to 2, and the text fragments in T1 are fully permuted and combined to construct a candidate name set P $\{P_j\}$. That is, P is a union set obtained by randomly selecting k text fragments from T1 and permuting and combining the k text fragments, and k has a value ranging from 1 to m−1.

For example, three text fragments "Sanqianjia", "ecological slimming", "Yinzuo garden shop" are recognized from the image shown in FIG. 3, and the "Yinzuo garden shop" is identified as the branch information fragment in 402. Then, the remaining text fragments "Sanqianjia", "ecological slimming" are fully permuted and combined to obtain the set P {"Sanqianjia", "ecological slimming", "Sanqianjia ecological slimming", "ecological slimming Sanqianjia"}. That is, four candidate names are obtained, i.e., "Sanqianjia", "ecological slimming", "Sanqianjia ecological slimming" and "ecological slimming Sanqianjia", and required to be ranked according to the probabilities of the four candidate names as the name of a POI.

In 404, it ranks the candidate names using a pre-trained name ranking model.

The name ranking model extracts at least one of a search web page feature, a document statistical feature and a semantic feature from each candidate name, determines the probability of each candidate name as the name of the POI, and then ranks the candidate names according to the probabilities. As a preferred implementation, the extraction of the search web page feature, the document statistical feature and the semantic feature is described as an example in this embodiment. That is, each $P_j$ is input into the name ranking model, the search web page feature, the document statistical feature and the semantic feature are extracted from $P_j$ to obtain the probability of $P_j$ as the name of the POI, and then, the ranking operation is performed according to the probability of each $P_j$.

Figure 5:
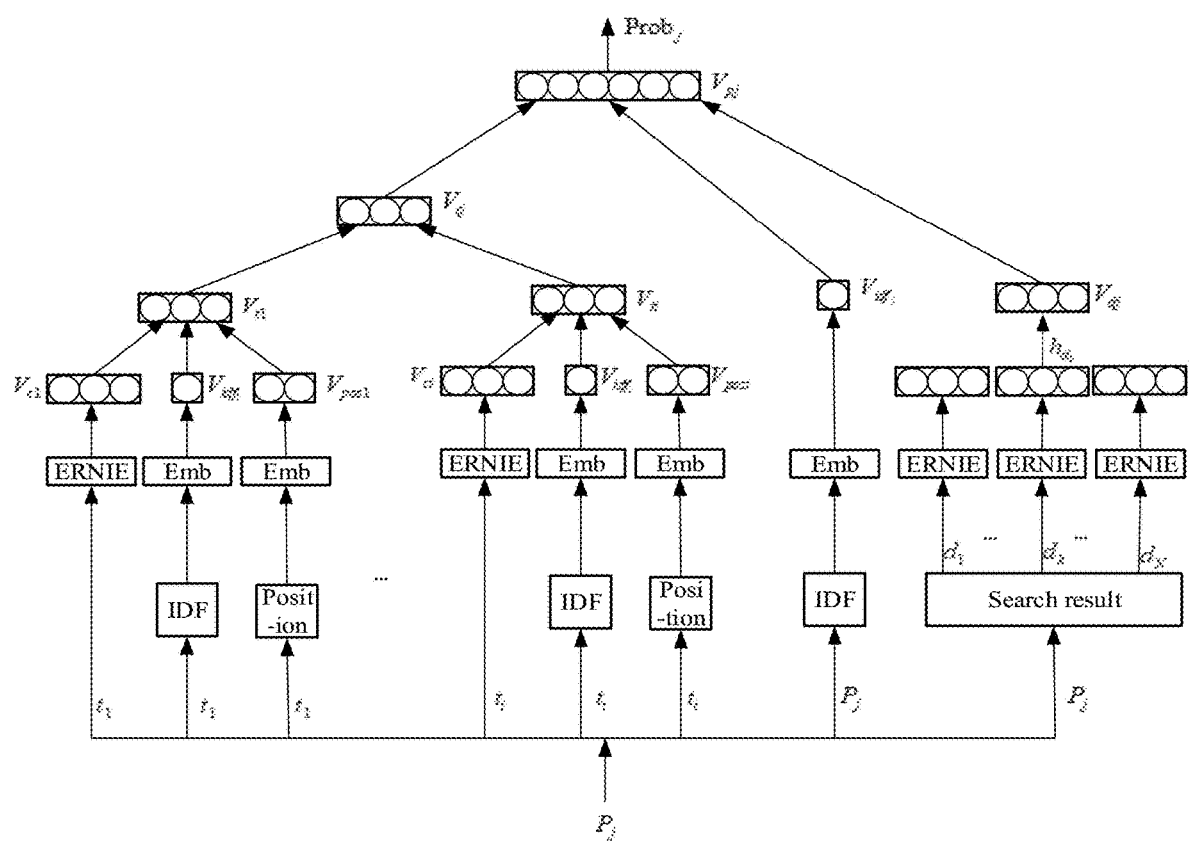
FIG. 5 is a schematic diagram of the architecture of a name ranking model according to an embodiment of the present application.

The extraction of the three features is described below in detail in conjunction with a model architecture shown in FIG. 5.

1) Extraction of Search Web Page Feature

When the search web page feature is extracted from the candidate name $P_j$, a search may be performed with the candidate name $P_j$ as a query (search keyword), and then, a semantic coding operation is performed on an acquired search result to obtain an implicit vector of the search result as the search web page feature of the candidate name $P_j$.

In order to reduce the amount of computation, in this embodiment, top N search result texts in the search result may be taken, and N is a preset positive integer. In addition, since titles of the search results are usually able to express the meanings of the search result texts well, title texts of the top N search results may be acquired. For example, the top N search results are denoted as $R=\{d_k\}$, $k=1, \ldots, N$.

For example, a web page search is performed with the candidate name "Sanqianjia ecological slimming" as the query, and the title texts of the top N search results are acquired from the search, which is helpful for acquiring the most reasonable name of the POI understood by the public. For example, the obtained title texts of the search results include "I am about to comment_Sanqianjia ecological slimming", "Sanqianjia ecological slimming bar", or the like. Then, the semantic coding operation is performed on each title text to obtain an implicit vector of the title text of each search result.

In order to solve the long tail phenomenon of the name of the POI, the semantic coding operation may be performed using a language model ERNIE with character granularity. However, in addition to the ERNIE, a traditional word2vec model, a glove model, or the like, may be adopted. The same applies to semantic coding operations to extract the implicit vector involved in subsequent embodiments.

For example, the semantic coding operation is performed on the title text $d_k$ of the search result to obtain a vector sequence, and then, the vector sequence is averaged to obtain the implicit vector $h_{d_k}$ of the title text $d_k$.

Then, the implicit vectors of the title texts of the search results are fused by means of an averaging operation, or the like, so as to obtain the implicit vectors of the search results. For example, the implicit vector $V_{dj}$ of the search result of $P_j$ is:

$$V_{dj} = \frac{1}{N}\sum_{k=1}^{N} h_{d_k}$$

2) Extraction of Document Statistical Feature

Sometimes, some candidate names are ambiguous, for example, the candidate name "Sanqianjia" may have a POI of "Sanqianjia ecological slimming", a POI of "Sanqianjia tea shop" and a POI of "Sanqianjia fresh milk tea". Therefore, a user may be obviously annoyed by the ambiguity problem if "Sanqianjia" is used as the name of the POI. In the embodiment of the present application, an inverse document frequency (IDF) feature of the candidate name may be introduced to describe the ideographic capability of the candidate name. If appearing less frequently in the whole network, the the candidate name $P_j$ is rarer and has a higher capability of independently expressing one POI.

Based on the above-mentioned theory, when the document statistical feature is extracted from the candidate name $P_j$, the IDF of the candidate name $P_j$ may be counted in web page data, and a representation vector of the IDF may be used as the document statistical feature of $P_j$. Specifically, the IDF of $P_j$ may be calculated with the following formula:

$$IDF = pow\left(\frac{\log \text{DOC\_NUM}}{\log DF}, \alpha\right)$$

wherein DOC_NUM represents the total number of web pages, DF represents the number of the web pages containing the candidate name $P_j$, the pow(x, y) function is used for solving the y power of x, and $\alpha$ is a hyper-parameter and may take an experimental value or be adjusted manually.

After the IDF of the candidate name $P_j$ is obtained, since the IDF is a continuous statistical value, for the stability of the model, the IDF may be discretized and then converted into dense vector representation with an embedding layer (denoted as Emb in FIG. 5); that is, an IDF representation vector $V_{idf_j}$ of $P_j$ is obtained.

3) Extraction of Semantic Feature

In the present application, a semantic coding operation may be directly performed on the candidate name to obtain an implicit vector of the candidate name as the semantic feature. However, the semantic encoding operation of the candidate name as a whole by an encoder at string granularity discards fragment-level information. In practice, a name fragment extracted from the image data of the POI is an ideographic whole, and therefore, as a preferred implementation, the extraction of the semantic feature of the candidate name mainly includes two steps of:

S1: obtaining a semantic representation vector of each text fragment contained in the candidate name based on at least one of a semantic feature, a position feature and a document statistical feature of each text fragment.

First, at least one of the semantic feature, the position feature and the document statistical feature is extracted for each text fragment $t_i$ contained in the candidate name $P_j$, and the extraction of these three features is described below as an example.

When the semantic feature of the text fragment $t_i$ is extracted, a semantic coding operation may be performed on the text fragment $t_i$ to obtain an implicit vector $V_{ci}$ of the text fragment $t_i$.

When the position feature of the text fragment $t_i$ is extracted, the position of the text fragment $t_i$ in the candidate name is mapped in a vector space to obtain a position representation vector $V_{posi}$ of the text fragment $t_i$.

When the document statistical feature of the text fragment $t_i$ is extracted, similar to the above extraction of the document statistical feature of the candidate name, the IDF of the text fragment may be counted in the web page data, and then discretized and converted into dense vector representation with the embedding layer (denoted as Emb in FIG. 5); that is, an IDF representation vector $V_{idf_i}$ of $t_i$ is obtained.

Finally, $V_{ci}$, $V_{posi}$ and $V_{idf_i}$ are spliced to obtain the semantic representation vector $V_{ti}$ of the text fragment $t_i$, for example, $$V_{ti}=[V_{ci}, V_{posi}, V_{idf_i}]$$

wherein [,] indicates that the vectors therein are spliced.

S2: fusing the semantic representation vectors of the text fragments to obtain the semantic representation vector of the candidate name.

For example, the semantic representation vector $V_{cj}$ of the candidate name $P_j$ is:

$$V_{cj} = \frac{1}{q}\sum_{i=1}^{q} V_{ti}$$

wherein q is the number of the text fragments contained in $P_j$.

After the above-mentioned three features of the candidate name $P_j$ are completed, the obtained implicit vector $V_{dj}$ of the search result of $P_j$, the IDF representation vector $V_{idfj}$ and the semantic representation vector $V_{cj}$ are spliced to obtain a feature vector $V_{pj}$ of $P_j$. For example:

$$V_{pj}=[V_{dj}, V_{idfj}, V_{cj}]$$

Then, the feature vector $V_{pj}$ of $P_j$ is passed through a multi-layer perceptron (MLP) to obtain the probability $Prob_j$ of $P_j$ as the name of the POI.

The above is the working principle of the name ranking model, and the building process of the name ranking model will be described in detail in the following in conjunction with the third embodiment.

In 405, it combines the top candidate name with the branch information fragment to obtain the name of the POI.

After each $P_j$ is ranked decreasingly according to the probability $Prob_j$ of each $P_j$, the top candidate name is selected and may be considered to be most suitable for constituting the name of the POI.

Continuing with the above example, by means of the above-mentioned process, it is assumed that the probabilities of four candidate names in the set P {"Sanqianjia", "ecological slimming", "Sanqianjia ecological slimming", "ecological slimming Sanqianjia"} are decreasingly determined as:

Sanqianjia ecological slimming: 0.93
Sanqianjia: 0.82
ecological slimming: 0.47
ecological slimming Sanqianjia: 0.21

Therefore, after the "Sanqianjia ecological slimming" is combined with the branch information fragment "Yinzuo garden shop" identified previously, the final name of the POI "Sanqianjia ecological slimming Yinzuo garden shop" is obtained.

After the name of the POI is finally determined, information, such as the name of the POI, an address, coordinates, or the like, may be stored into the POI database in conjunction with location information corresponding to the image data of the POI. When the user subsequently searches the POI in a map application, the service may be provided for the user based on the information, such as the name of the POI, the address, the coordinates, or the like.

Third Embodiment

Figure 6:
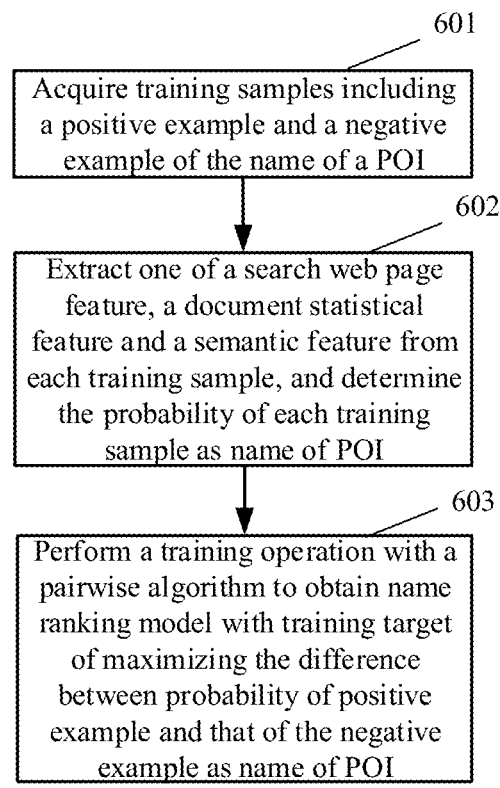
FIG. 6 is a flow chart of a method for building the ranking model according to an embodiment of the present application.

FIG. 6 is a flow chart of a method for building a ranking model according to an embodiment of the present application, and as shown in FIG. 6, the method may include the following steps:

In 601, it acquires training samples including a positive example and a negative example of the name of a POI.

In the present application, the name of the POI may be acquired from the existing POI database, and since the existing name of the POI in the POI database is usually correct, the name of the POI is taken as the positive example; then, some incorrect names are constructed manually as the negative examples based on the existing name of the POI in the POI database.

For example, it is assumed that the existing name of the POI "RYB kindergarten Shangdi branch" is acquired from the POI database as the positive example. However, preferably, in order to adapt to the second embodiment, the branch information fragment in the name of the POI may be removed to obtain "RYB kindergarten" as the positive example. Then, "RYB", "kindergarten RYB", "kindergarten", or the like, are manually constructed as the negative examples. A large number of positive examples and negative examples are constructed in this way to serve as the training samples.

In 602, it extracts one of a search web page feature, a document statistical feature and a semantic feature from each training sample, and determines the probability of each training sample as the name of the POI.

At least one of the search web page feature, the document statistical feature and the semantic feature is extracted for each training sample (i.e., each positive example and each negative example) in the manner provided in the step 404 in the second embodiment. Taking the extraction of the search web page feature, the document statistical feature and the semantic feature as an example, the implicit vector of the search result of each training sample, the IDF representation vector and the semantic representation vector are extracted and spliced to obtain the feature vector of the training sample. Then, the feature vector of the training sample is passed through the MLP to obtain the probability of the training sample as the name of the POI. The specific process is described in the step 404 in the embodiment, and is not repeated herein.

In 603, it performs a training operation with a pairwise algorithm to obtain the name ranking model with a training target of maximizing the difference between the probability of the positive example as the name of the POI and the probability of the negative example as the name of the POI.

The pairwise algorithm is utilized in the model training process in the present application. That is, a document pair is formed by the positive example and the negative example of one training sample, and then, the difference between the probability of the positive example as the name of the POI and the probability of the negative example as the name of the POI is maximized as much as possible in the model training process. For example, an adopted loss function Loss may be:

$$\text{Loss} = \max(0, \text{margin} - (Prob_p - Prob_n)) + \frac{\gamma}{2}\sum \theta^2$$

wherein margin and $\gamma$ are hyper-parameters, $\theta$ is one of model parameters, $Prob_p$ is the probability of the positive example as the name of the POI, and $Prob_n$ is the probability of the negative example as the name of the POI. An L2 regularization method is used in the above-mentioned Loss to prevent a model overfitting problem.

In the training process, the model parameters may be optimized with a random gradient descent method.

The methods according to the present application are described above in detail, and apparatuses according to the present application will be described below in detail in conjunction with embodiments.

Fourth Embodiment

Figure 7:
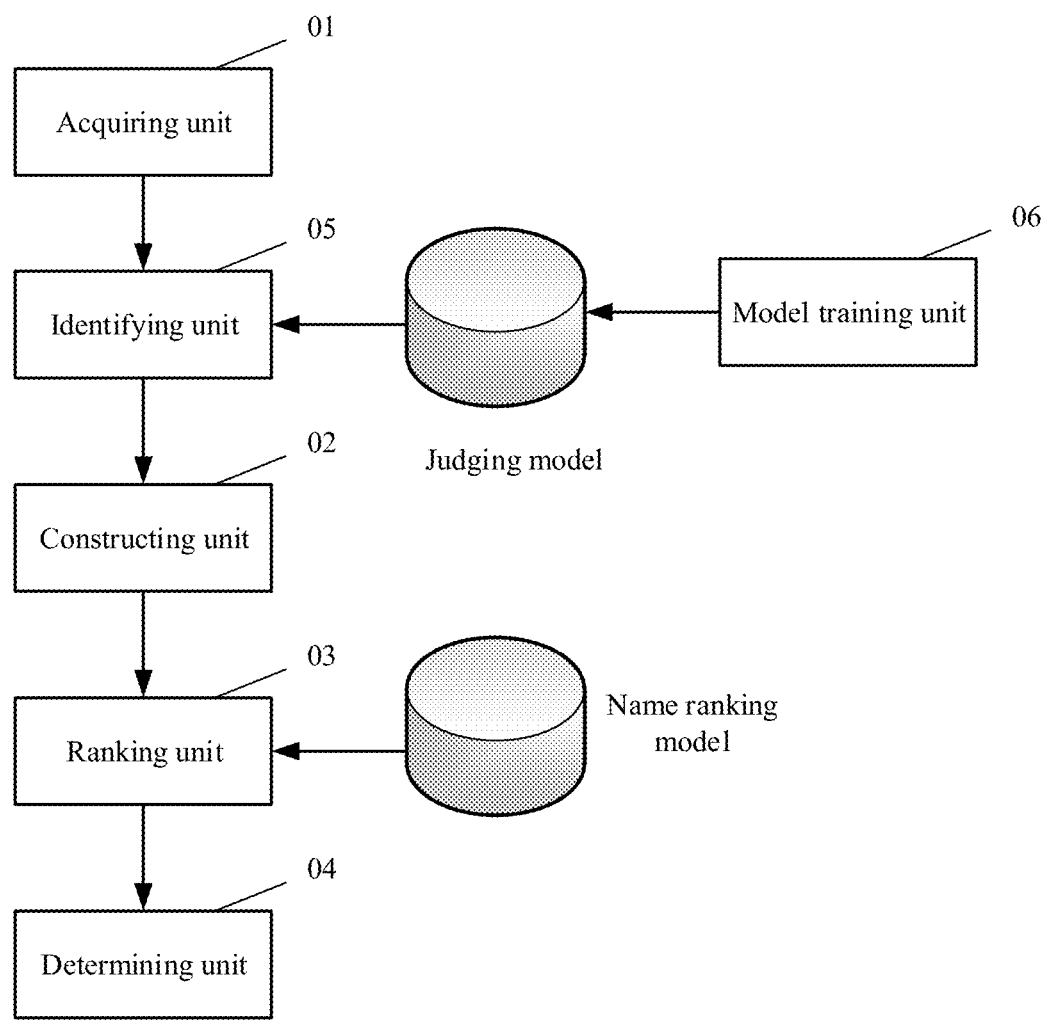
FIG. 7 is a structural diagram of an apparatus for extracting the name of a POI according to an embodiment of the present application.

FIG. 7 is a structural diagram of an apparatus for extracting the name of a POI according to an embodiment of the present application, and as shown in FIG. 7, the apparatus may include an acquiring unit 01, a constructing unit 02, a ranking unit 03 and a determining unit 04, and may further include an identifying unit 05 and a model training unit 06. The main functions of each constitutional unit are as follows.

The acquiring unit 01 is configured to acquire two or more text fragments identified from image data of the POI. The way for identifying the text fragments from the image data of the POI is not limited in the present application, and for example, the text fragments may be identified by means of OCR.

The constructing unit 02 is configured to construct two or more candidate names using the text fragments.

The ranking unit 03 is configured to rank the candidate names using a pre-trained name ranking model; wherein the name ranking model determines the probability of each candidate name as the name of the POI using at least one of a search web page feature, a document statistical feature and a semantic feature extracted from each candidate name, and ranks the candidate names according to the probabilities.

The determining unit 04 is configured to determine the name of the POI according to the result of the ranking of the ranking unit.

As one implementation, the constructing unit 02 may permute and combine the text fragments to obtain the two or more candidate names. Then, the determining unit 04 takes the top candidate name as the name of the POI.

As a preferred implementation, the identifying unit 05 may first identify a branch information fragment from the text fragments. Then, the constructing unit 02 permutes and combines other text fragments in the text fragments than the branch information fragment to obtain the two or more candidate names. Correspondingly, the determining unit 04 combines the top candidate name with the branch information fragment to obtain the name of the POI.

Specifically, the identifying unit 05 may judge each text fragment using a pre-trained judging model to determine whether each text fragment is the branch information fragment.

The model training unit 06 is responsible for pre-training the judging model. Specifically, sample data may be acquired from a POI database with a branch information text as a positive sample and a non-branch information text as a negative sample; and the judging model is trained with the sample data.

The ranking unit 03 may extract the search web page feature from the candidate name using the name ranking model specifically by:

performing a search with the candidate name as a query; and performing a semantic coding operation on an acquired search result to obtain an implicit vector of the search result as the search web page feature of the candidate name.

The ranking unit 03 may perform the semantic coding operation on the acquired search result to obtain the implicit vector of the search result specifically by:

acquiring top N search result texts, N being a preset positive integer;

performing a semantic coding operation on each acquired search result text to obtain an implicit vector of each search result text; and fusing the implicit vectors of the search result texts to obtain the implicit vector of the search result.

The ranking unit 03 may extract the document statistical feature from the candidate name using the name ranking model specifically by:

counting an inverse document frequency of the candidate name in web page data; and taking a representation vector of the inverse document frequency as the document statistical feature of the candidate name.

The ranking unit 03 extracts the semantic feature from the candidate name using the name ranking model specifically by:

obtaining a semantic representation vector of each text fragment contained in the candidate name based on at least one of a semantic feature, a position feature and a document statistical feature of each text fragment; and fusing the semantic representation vectors of the text fragments to obtain the semantic representation vector of the candidate name.

The ranking unit 03 may determine the semantic representation vector of the text fragment by:

performing a semantic coding operation on the text fragment to obtain an implicit vector of the text fragment;

mapping the position of the text fragment in a candidate name in a vector space to obtain a position representation vector of the text fragment;

counting an inverse document frequency of the text fragment in the web page data to obtain a representation vector of the inverse document frequency; and splicing the implicit vector, the position representation vector and the representation vector of the inverse document frequency of the text fragment to obtain the semantic representation vector of the text fragment.

Fifth Embodiment

Figure 8:
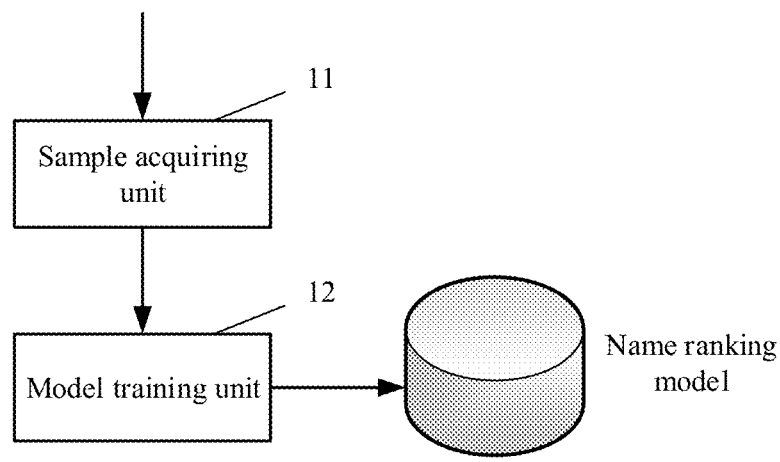
FIG. 8 is a structural diagram of an apparatus for building the name ranking model according to an embodiment of the present application.

FIG. 8 is a structural diagram of an apparatus for building a name ranking model according to an embodiment of the present application, and as shown in FIG. 8, the apparatus may include a sample acquiring unit 11 and a model training unit 12. The main functions of each constitutional unit are as follows.

The sample acquiring unit 11 is configured to acquire training samples including a positive example and a negative example of the name of a POI.

Specifically, the name of the POI may be acquired from the existing POI database, and since the existing name of the POI in the POI database is usually correct, the name of the POI is taken as the positive example; then, some incorrect names are constructed manually as the negative examples based on the existing name of the POI in the POI database. Preferably, the branch information fragment in the name of the POI may be removed to obtain the positive example, and the negative example is constructed on this basis.

The model training unit 12 is configured to extract at least one of a search web page feature, a document statistical feature and a semantic feature from each training sample, and determine the probability of each training sample as the name of the POI; perform a training operation with a pairwise algorithm to obtain the name ranking model with a training target of maximizing the difference between the probability of the positive example as the name of the POI and the probability of the negative example as the name of the POI.

Specifically, the model training unit 12 may extract the search web page feature from the training sample specifically by:

performing a search with the training sample as a query; and performing a semantic coding operation on an acquired search result to obtain an implicit vector of the search result as the search web page feature of the training sample.

The model training unit 12 may perform the semantic coding operation on the acquired search result to obtain the implicit vector of the search result specifically by:

acquiring top N search result texts, N being a preset positive integer;

performing a semantic coding operation on each acquired search result text to obtain an implicit vector of each search result text; and fusing the implicit vectors of the search result texts to obtain the implicit vector of the search result.

The model training unit 12 may extract the document statistical feature from the training sample specifically by:

counting an inverse document frequency of the training sample in web page data; and taking a representation vector of the inverse document frequency as the document statistical feature of the training sample.

The model training unit 12 extracts the semantic feature from the training sample specifically by:

obtaining a semantic representation vector of each text fragment contained in the training sample based on at least one of a semantic feature, a position feature and a document statistical feature of each text fragment; and fusing the semantic representation vectors of the text fragments to obtain the semantic representation vector of the training sample.

The model training unit 12 may determine the semantic representation vector of the text fragment by:

performing a semantic coding operation on the text fragment to obtain an implicit vector of the text fragment;

mapping the position of the text fragment in a candidate name in a vector space to obtain a position representation vector of the text fragment;

counting an inverse document frequency of the text fragment in the web page data to obtain a representation vector of the inverse document frequency; and splicing the implicit vector, the position representation vector and the representation vector of the inverse document frequency of the text fragment to obtain the semantic representation vector of the text fragment.

According to the embodiments of the present application, there are also provided an electronic device and a readable storage medium.

Figure 9:
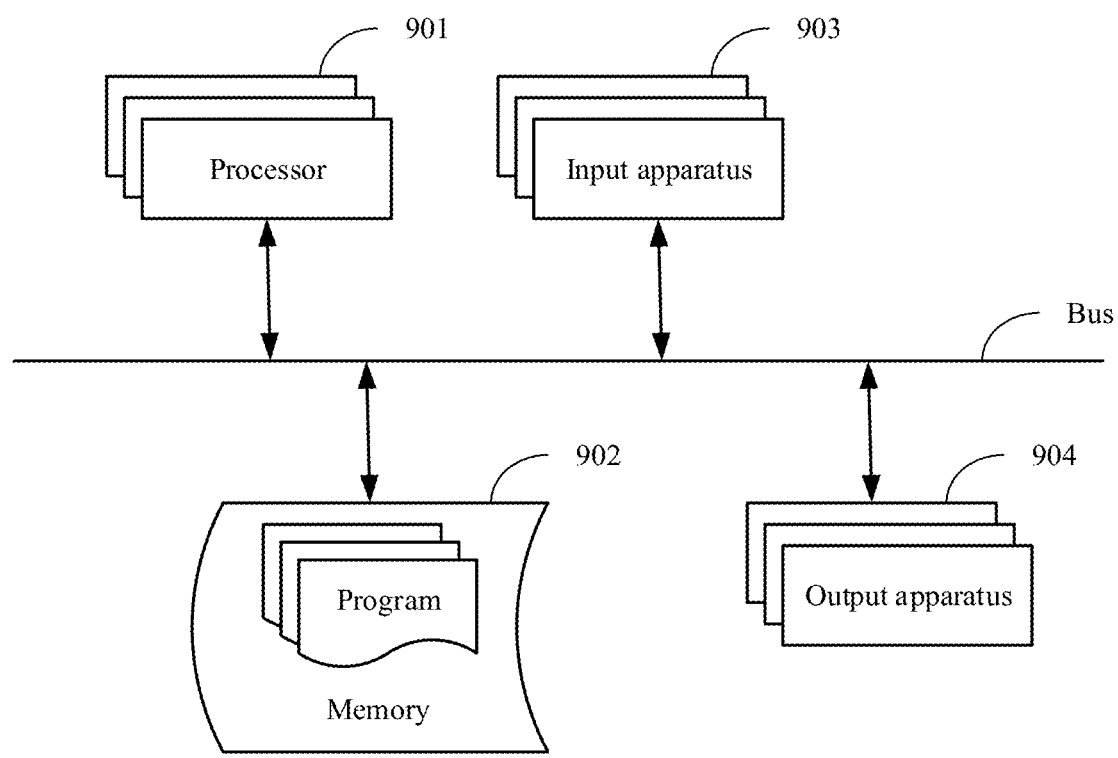
FIG. 9 is a block diagram of an electronic device configured to implement the method according to the embodiments of the present application.

FIG. 9 is a block diagram of an electronic device for the methods according to the embodiments of the present application. The electronic device is intended to represent various forms of digital computers, such as laptop computers, desktop computers, workstations, personal digital assistants, servers, blade servers, mainframe computers, and other appropriate computers. The electronic device may also represent various forms of mobile apparatuses, such as personal digital processors, cellular telephones, smart phones, wearable devices, and other similar computing apparatuses. The components shown herein, their connections and relationships, and their functions, are meant to be exemplary only, and are not meant to limit implementation of the present application described and/or claimed herein.

As shown in FIG. 9, the electronic device includes one or more processors 901, a memory 902, and interfaces configured to connect the various components, including high-speed interfaces and low-speed interfaces. The various components are interconnected using different buses and may be mounted at a common motherboard or in other manners as desired. The processor may process instructions for execution within the electronic device, including instructions stored in or at the memory to display graphical information for a GUI at an external input/output apparatus, such as a display device coupled to the interface. In other implementations, plural processors and/or plural buses may be used with plural memories, if desired. Also, plural electronic devices may be connected, with each device providing some of necessary operations (for example, as a server array, a group of blade servers, or a multi-processor system). In FIG. 9, one processor 901 is taken as an example.

The memory 902 is configured as the non-transitory computer readable storage medium according to the present application. The memory stores instructions executable by the at least one processor to cause the at least one processor to perform a method according to the present application. The non-transitory computer readable storage medium according to the present application stores computer instructions for causing a computer to perform the method according to the present application.

The memory 902 which is a non-transitory computer readable storage medium may be configured to store non-transitory software programs, non-transitory computer executable programs and modules, such as program instructions/modules corresponding to the method according to the embodiments of the present application. The processor 901 executes various functional applications and data processing of a server, that is, implements the method according to the above-mentioned embodiments, by running the non-transitory software programs, instructions, and modules stored in the memory 902.

The memory 902 may include a program storage area and a data storage area, wherein the program storage area may store an operating system and an application program required for at least one function; the data storage area may store data created according to use of the electronic device, or the like. Furthermore, the memory 902 may include a high-speed random access memory, or a non-transitory memory, such as at least one magnetic disk storage device, a flash memory device, or other non-transitory solid state storage devices. In some embodiments, optionally, the memory 902 may include memories remote from the processor 901, and such remote memories may be connected to the electronic device via a network. Examples of such a network include, but are not limited to, the Internet, intranets, local area networks, mobile communication networks, and combinations thereof.

The electronic device may further include an input apparatus 903 and an output apparatus 904. The processor 901, the memory 902, the input apparatus 903 and the output apparatus 904 may be connected by a bus or other means, and FIG. 9 takes the connection by a bus as an example.

The input apparatus 903 may receive input numeric or character information and generate key signal input related to user settings and function control of the electronic device, such as a touch screen, a keypad, a mouse, a track pad, a touch pad, a pointing stick, one or more mouse buttons, a trackball, a joystick, or the like. The output apparatus 904 may include a display device, an auxiliary lighting apparatus (for example, an LED) and a tactile feedback apparatus (for example, a vibrating motor), or the like. The display device may include, but is not limited to, a liquid crystal display (LCD), a light emitting diode (LED) display, and a plasma display. In some implementations, the display device may be a touch screen.

Various implementations of the systems and technologies described here may be implemented in digital electronic circuitry, integrated circuitry, ASICs (application specific integrated circuits), computer hardware, firmware, software, and/or combinations thereof. These various implementations may be implemented in one or more computer programs which are executable and/or interpretable on a programmable system including at least one programmable processor, and the programmable processor may be special or general, and may receive data and instructions from, and transmitting data and instructions to, a storage system, at least one input apparatus, and at least one output apparatus.

These computer programs (also known as programs, software, software applications, or codes) include machine instructions for a programmable processor, and may be implemented using high-level procedural and/or object-oriented programming languages, and/or assembly/machine languages. As used herein, the terms "machine readable medium" and "computer readable medium" refer to any computer program product, device and/or apparatus (for example, magnetic discs, optical disks, memories, programmable logic devices (PLDs)) for providing machine instructions and/or data to a programmable processor, including a machine readable medium which receives machine instructions as a machine readable signal. The term "machine readable signal" refers to any signal for providing machine instructions and/or data to a programmable processor.

To provide interaction with a user, the systems and technologies described here may be implemented on a computer having: a display apparatus (for example, a CRT (cathode ray tube) or LCD (liquid crystal display) monitor) for displaying information to a user; and a keyboard and a pointing apparatus (for example, a mouse or a trackball) by which a user may provide input to the computer. Other kinds of apparatuses may also be used to provide interaction with a user; for example, feedback provided to a user may be any form of sensory feedback (for example, visual feedback, auditory feedback, or tactile feedback); and input from a user may be received in any form (including acoustic, voice or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which are run on respective computers and have a client-server relationship to each other.

It should be understood that various forms of the flows shown above may be used and reordered, and steps may be added or deleted. For example, the steps described in the present application may be executed in parallel, sequentially, or in different orders, and are not limited herein as long as the desired results of the technical solution disclosed in the present application may be achieved.

The above-mentioned embodiments are not intended to limit the scope of the present application. It should be understood by those skilled in the art that various modifications, combinations, sub-combinations and substitutions may be made, depending on design requirements and other factors. Any modification, equivalent substitution and improvement made within the spirit and principle of the present application all should be included in the extent of protection of the present application.

What is claimed is:

1. A method for extracting the name of a point of interest (POI), comprising:
    acquiring two or more text fragments identified from image data of the POI;
    constructing two or more candidate names using the text fragments; and
    ranking the candidate names using a pre-trained name ranking model, and determining the name of the POI according to the result of the ranking;
    wherein the name ranking model determines the probability of each candidate name as the name of the POI using at least one of a search web page feature, a document statistical feature and a semantic feature extracted from each candidate name, and ranks the candidate names according to the probabilities,
    wherein extracting the search web page feature from the candidate name comprises:
    performing a search with the candidate name as a query; and
    performing a semantic coding operation on an acquired search result to obtain an implicit vector of the search result as the search web page feature of the candidate name,
    wherein the performing a semantic coding operation on an acquired search result to obtain an implicit vector of the search result comprises:
    acquiring top N search result texts, N being a preset positive integer;
    performing a semantic coding operation on each acquired search result text to obtain an implicit vector of each search result text; and
    fusing the implicit vectors of the search result texts to obtain the implicit vector of the search result.

2. The method according to claim 1, wherein the constructing two or more candidate names using the text fragments comprises:
    permuting and combining the text fragments to obtain the two or more candidate names;
    the determining the name of the POI according to the result of the ranking comprises:
    taking the top candidate name as the name of the POI.

3. The method according to claim 1, wherein the constructing two or more candidate names using the text fragments comprises:
    identifying a branch information fragment from the text fragments; and
    permuting and combining other text fragments in the text fragments than the branch information fragment to obtain the two or more candidate names;
    the determining the name of the POI according to the result of the ranking comprises:
    combining the top candidate name with the branch information fragment to obtain the name of the POI.

4. The method according to claim 3, wherein the identifying a branch information fragment from the text fragments comprises:
    judging each text fragment using a pre-trained judging model to determine whether each text fragment is the branch information fragment.

5. The method according to claim 4, wherein the judging model is pre-trained by:

acquiring sample data from a POI database with a branch information text as a positive sample and a non-branch information text as a negative sample; and training the judging model with the sample data.

6. The method according to claim 1, wherein extracting the document statistical feature from the candidate name comprises:

counting an inverse document frequency of the candidate name in web page data; and taking a representation vector of the inverse document frequency as the document statistical feature of the candidate name.

7. The method according to claim 1, wherein extracting the semantic feature from the candidate name comprises:

obtaining a semantic representation vector of each text fragment contained in the candidate name based on at least one of a semantic feature, a position feature and a document statistical feature of each text fragment; and fusing the semantic representation vectors of the text fragments to obtain the semantic representation vector of the candidate name.

8. The method according to claim 7, wherein the semantic representation vector of the text fragment is determined by:

performing a semantic coding operation on the text fragment to obtain an implicit vector of the text fragment;

mapping the position of the text fragment in a candidate name in a vector space to obtain a position representation vector of the text fragment;

counting an inverse document frequency of the text fragment in the web page data to obtain a representation vector of the inverse document frequency; and splicing the implicit vector, the position representation vector and the representation vector of the inverse document frequency of the text fragment to obtain the semantic representation vector of the text fragment.

9. A method for building a name ranking model, comprising:

acquiring training samples comprising a positive example and a negative example of the name of a POI;

extracting at least one of a search web page feature, a document statistical feature and a semantic feature from each training sample, and determining the probability of each training sample as the name of the POI; and performing a training operation with a pairwise algorithm to obtain the name ranking model with a training target of maximizing the difference between the probability of the positive example as the name of the POI and the probability of the negative example as the name of the POI, wherein extracting the search web page feature from the training sample comprises:

performing a search with the training sample as a query; and performing a semantic coding operation on an acquired search result to obtain an implicit vector of the search result as the search web page feature of the training sample, wherein the performing a semantic coding operation on an acquired search result to obtain an implicit vector of the search result comprises:

acquiring top N search result texts, N being a preset positive integer;

performing a semantic coding operation on each acquired search result text to obtain an implicit vector of each search result text; and fusing the implicit vectors of the search result texts to obtain the implicit vector of the search result.

10. The method according to claim 9, wherein extracting the document statistical feature from the training sample comprises:

counting an inverse document frequency of the training sample in web page data; and taking a representation vector of the inverse document frequency as the document statistical feature of the training sample.

11. The method according to claim 9, wherein extracting the semantic feature from the training sample comprises:

obtaining a semantic representation vector of each text fragment contained in the training sample based on at least one of a semantic feature, a position feature and a document statistical feature of each text fragment; and fusing the semantic representation vectors of the text fragments to obtain the semantic representation vector of the training sample.

12. The method according to claim 11, wherein the semantic representation vector of the text fragment is determined by:

performing a semantic coding operation on the text fragment to obtain an implicit vector of the text fragment;

mapping the position of the text fragment in a candidate name in a vector space to obtain a position representation vector of the text fragment;

counting an inverse document frequency of the text fragment in the web page data to obtain a representation vector of the inverse document frequency; and splicing the implicit vector, the position representation vector and the representation vector of the inverse document frequency of the text fragment to obtain the semantic representation vector of the text fragment.

13. An electronic device, comprising:

at least one processor; and a memory communicatively connected with the at least one processor;

wherein the memory stores instructions executable by the at least one processor, and the instructions are executed by the at least one processor to enable the at least one processor to perform a method for extracting the name of a point of interest (POI) comprising:

acquiring two or more text fragments identified from image data of the POI;

constructing two or more candidate names using the text fragments; and ranking the candidate names using a pre-trained name ranking model, and determining the name of the POI according to the result of the ranking;

wherein the name ranking model determines the probability of each candidate name as the name of the POI using at least one of a search web page feature, a document statistical feature and a semantic feature extracted from each candidate name, and ranks the candidate names according to the probabilities, wherein extracting the search web page feature from the candidate name comprises:

performing a search with the candidate name as a query; and performing a semantic coding operation on an acquired search result to obtain an implicit vector of the search result as the search web page feature of the candidate name, wherein the performing a semantic coding operation on an acquired search result to obtain an implicit vector of the search result comprises:
acquiring top N search result texts, N being a preset positive integer;
performing a semantic coding operation on each acquired search result text to obtain an implicit vector of each search result text; and
fusing the implicit vectors of the search result texts to obtain the implicit vector of the search result.

14. An electronic device, comprising:
at least one processor; and
a memory communicatively connected with the at least one processor;
wherein the memory stores instructions executable by the at least one processor, and the instructions are executed by the at least one processor to enable the at least one processor to perform a method for building a name ranking model comprising:
acquiring training samples comprising a positive example and a negative example of the name of a POI;
extracting at least one of a search web page feature, a document statistical feature and a semantic feature from each training sample, and determining the probability of each training sample as the name of the POI; and
performing a training operation with a pairwise algorithm to obtain the name ranking model with a training target of maximizing the difference between the probability of the positive example as the name of the POI and the probability of the negative example as the name of the POI;
wherein extracting the search web page feature from the training sample comprises:
performing a search with the training sample as a query; and
performing a semantic coding operation on an acquired search result to obtain an implicit vector of the search result as the search web page feature of the training sample,
wherein the performing a semantic coding operation on an acquired search result to obtain an implicit vector of the search result comprises:
acquiring top N search result texts, N being a preset positive integer;
performing a semantic coding operation on each acquired search result text to obtain an implicit vector of each search result text; and
fusing the implicit vectors of the search result texts to obtain the implicit vector of the search result.

15. A non-transitory computer-readable storage medium storing computer instructions therein, wherein the computer instructions are used to cause the computer to perform a method for extracting the name of a point of interest (POI) comprising:
acquiring two or more text fragments identified from image data of the POI;
constructing two or more candidate names using the text fragments; and
ranking the candidate names using a pre-trained name ranking model, and determining the name of the POI according to the result of the ranking;

wherein the name ranking model determines the probability of each candidate name as the name of the POI using at least one of a search web page feature, a document statistical feature and a semantic feature extracted from each candidate name, and ranks the candidate names according to the probabilities,
wherein extracting the search web page feature from the candidate name comprises:
performing a search with the candidate name as a query; and
performing a semantic coding operation on an acquired search result to obtain an implicit vector of the search result as the search web page feature of the candidate name,
wherein the performing a semantic coding operation on an acquired search result to obtain an implicit vector of the search result comprises:
acquiring top N search result texts, N being a preset positive integer;
performing a semantic coding operation on each acquired search result text to obtain an implicit vector of each search result text; and
fusing the implicit vectors of the search result texts to obtain the implicit vector of the search result.

16. A non-transitory computer-readable storage medium storing computer instructions therein, wherein the computer instructions are used to cause the computer to perform a method for building a name ranking model comprising:
acquiring training samples comprising a positive example and a negative example of the name of a POI;
extracting at least one of a search web page feature, a document statistical feature and a semantic feature from each training sample, and determining the probability of each training sample as the name of the POI; and
performing a training operation with a pairwise algorithm to obtain the name ranking model with a training target of maximizing the difference between the probability of the positive example as the name of the POI and the probability of the negative example as the name of the POI,
wherein extracting the search web page feature from the training sample comprises:
performing a search with the training sample as a query; and
performing a semantic coding operation on an acquired search result to obtain an implicit vector of the search result as the search web page feature of the training sample,
wherein the performing a semantic coding operation on an acquired search result to obtain an implicit vector of the search result comprises:
acquiring top N search result texts, N being a preset positive integer;
performing a semantic coding operation on each acquired search result text to obtain an implicit vector of each search result text; and
fusing the implicit vectors of the search result texts to obtain the implicit vector of the search result.

* * * * *